United States Patent [19]

Hofstede et al.

[11] 4,162,945

[45] Jul. 31, 1979

[54] INSTALLATION AND PROCESS FOR MULTISTAGE-CONTROLLED FLASH EVAPORATION

[75] Inventors: Marinus J. Hofstede, Berkel & Rodenrys; Gerardus Beentjes, Opmeer, both of Netherlands; Laslo Szücs; Csaba Tasnádi, both of Budapest, Hungary

[73] Assignee: Cojafex B.V., Rotterdam, Netherlands

[21] Appl. No.: 785,715

[22] Filed: Apr. 7, 1977

[51] Int. Cl.² .............................................. B01D 1/22
[52] U.S. Cl. .............................. 202/173; 159/13 A; 159/2 MS; 202/236
[58] Field of Search .............. 159/13 A, 14, 15, 2 MS, 159/49; 203/88; 202/236, 205, 173

[56] References Cited

U.S. PATENT DOCUMENTS

| | | | |
|---|---|---|---|
| 2,782,150 | 2/1957 | Stalcup | 202/236 |
| 3,427,227 | 2/1969 | Chamberlin | 203/88 |
| 3,830,706 | 8/1974 | Kogan | 159/2 MS |

Primary Examiner—Hiram H. Bernstein
Attorney, Agent, or Firm—Karl W. Flocks

[57] ABSTRACT

Installation and process for multi-flash evaporation, in particular for the desalinization of sea water, in which the liquid to be evaporated is led through at least one passage channel which is constituted by a series of alternately snail-shell-shaped or volute spaces in which evaporation takes place and buffer spaces acting as a liquid slot or syphon for transporting liquid from a snail-shell-shaped space to the next snail-shell-shaped space.

11 Claims, 7 Drawing Figures

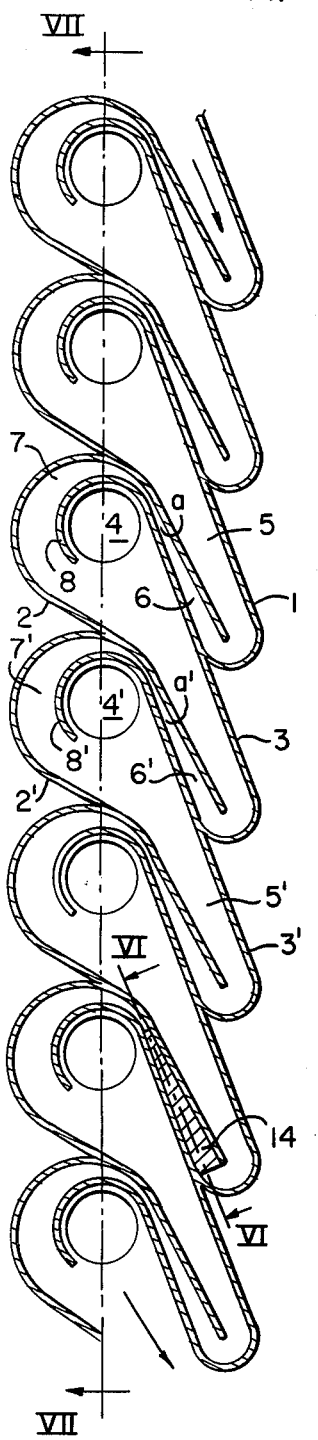
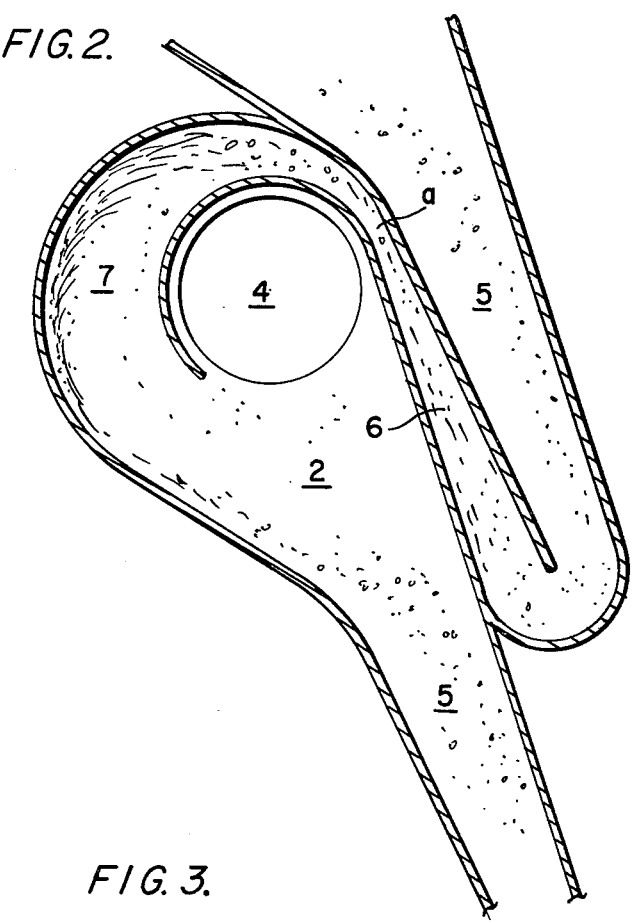
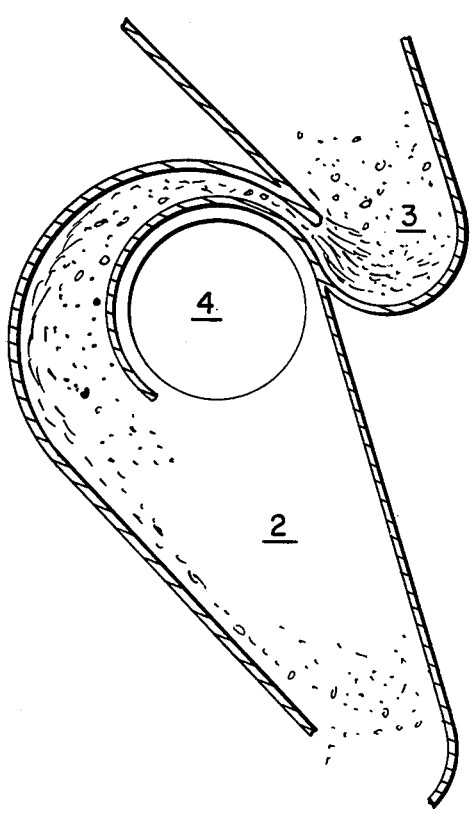

INSTALLATION AND PROCESS FOR MULTISTAGE-CONTROLLED FLASH EVAPORATION

The invention relates to an installation and process for flash evaporation, especially for preparing fresh water by means of de-salting sea water, but also for the removal of solvents by evaporation, therefore in general for distilling liquids under the influence of temperature and/or pressure.

One of the practical methods of preparing drinking water or fresh water in general consists in the use of so-called multi-stage-flash evaporation. This is obtained by letting the liquid to be evaporated, e.g. sea water, flow through a number of subsequent chambers (stages) (so-called flash chambers), whereas in each chamber or stage a part of the flowing water is converted into steam. This steam is precipitated on a series of condensation surfaces, which are cooled with the water present in the same circuit and which are provided in flash chambers or in condensate chambers connected thereto, whereas the cooling water flows in the opposite direction of the water in the evaporation chambers. The heat necessary for the evaporation is thus recovered for an important part as condensation heat.

The passage of the liquid to be evaporated from a chamber to a next chamber, where a lower pressure prevails, usually takes place through a rather narrow orifice. The liquid to be evaporated thereby suffers a sudden drop in pressure. In order to give the vapour, when then occurs in the form of bubbles, enough opportunity to separate itself from the water, the chambers, through which the liquid flows in one direction, will have to be of relatively large size.

The narrow orifice, where the drop in pressure between the chambers occurs, is set once, which implies that the quantity of liquid flowing through must remain constant between relatively narrow limits in order to maintain the right drop in pressure. For this reason it is practically impossible to vary the quantity that flows through and thereby the yield of pure liquid without using regulating devices between the chambers.

The only but very impractical way to modify the production without these devices, is to modify the total drop in temperature over several series-connected flash chambers at the same time as the modified quantity of liquid.

This lack of adaption of the quantity of liquid and the tendency, for economic reasons, to make the evaporators larger and larger (especially for de-salting sea water the dimensions are very large) have the consequence that the operation of today's evaporators is characterized by its very great inflexibility.

Large water factories which use mult-stage-flash evaporators, therefore need very large storage tanks to cope with a varying demand as well as with a temporary standstill of the installation.

A further drawback of the present flash evaporators is that also the evaporation itself, which takes place in an almost explosion-like way from a large mass of water which flows over the bottom of the evaporation chambers and from which the vapour must rise, is not optimum. This non-optimum evaporation, in combination with the necessity caused thereby to provide a drop-catcher (demister) between an evaporation chamber and the corresponding condenser, is manifested in an extra temperature difference between the vapour which condensates in the condenser and the water from which that vapour is formed in the evaporation chamber.

The temperature difference caused by non-optimum evaporation can be eliminated almost entirely when the drop in pressure of the water takes place gradually instead of suddenly and whereas the vapour not being formed from a larger mass (thick layer), the vapour not being formed from a large mass of water, but from a thin film in a controlled way.

For such an evaporator, which could be called flash film evaporator, several ideas are known, as is indicated in the article by Othmer about desalinization of sea water in the Encyclopedia of Chemical Engineering, volume 22, 2nd edition 1970, pp 32 through 39.

Flash evaporation in this way offers major advantages from the viewpoint of evaporation technique, but such installations have a complicated construction and a relatively large volume, because low vapour speeds are necessary for an efficient phase separation liquid vapour separation. That's why very large apparatus are necessary in rato to the capacity, which implies high investments.

Also the Office of Saline Water (O.S.W.) has conducted extensive research in order to arrive at better technologies or construction methods for multi-stage-flash evaporators, about which many publications have been made in the annual reports of the O.S.W. (see among others Saline Water Conversion Report for 1969–1970 and 1970–1971). This research led to the conclusion, that a real improvement of this type of evaporators could be possible if a construction could be found with which the evaporation could take place in a controlled way, without requiring high investments.

In as far as is known, the methods proposed in theory for this type of evaporation have found no practical application, because the investments and the complexity of construction would rise to a level that is unsatisfactory. But it has been demonstrated that a method, in which the evaporation would take place in a vertical stream from above to below, would be a more favourable starting point than the present method in which the liquid to be evaporated flows mainly horizontally.

One of the problems occurring in the development of multi-stage-flash evaporators is that of efficient phase separation. In the usual evaporators, this separation requires either much space and therefore material, or much energy when e.g. drip-catchers are used.

In this connection, reference can be made to a publication in 1971 by John McDermott: "Desalinization by Distillation—Recent Developments". Also U.S. Pat. No. 3,446,189, which however describes no multi-phase evaporation, and French Pat. Specification No. 1 568 954, which describes a complicated installation for phase evaporation, should be mentioned.

The purpose of the present invention is to provide an installation and process for multi-stage-controlled-flash evaporation with a high flexibility, a high yield and a very compact construction of the installation. An embodiment of the evaporator according to the invention is characterized by at least one, mainly slot-shaped passage channel which runs from the supply for the liquid to be evaporated to the exhaust of the unevaporated liquid, which channel forms a series of alternately snail-shell-shaped (volute-shaped) spaces and bag-shaped buffer spaces, whereas in the former spaces mainly evaporation takes place and in the latter spaces mainly transportation of unevaporated liquid from a snail-shell-shaped space to the next snail-shell-shaped space.

The number of snail-shell-shaped spaces, each of which is connected individually to a condenser space, forms the number of stages. The buffer spaces, which preferably are syphon-shaped and converging in the flow direction, are filled for an important part with liquid during operation and thus constitute a liquid lock between two subsequent small-shell-shaped evaporation spaces which show a difference in pressure. As will be explained later, they also contribute to that the next evaporation space is supplied with liquid without vapour bubbles. Of each snail-shell-shaped evaporation space with horizontally situated longitudinal axis, the curved and in cross-section slot-shaped entry channel is carried out diverging. One of the walls of this channel can partially surround the central part of the evaporation space, which central part is provided in one of the or in both end walls of an exhaust orifice for vapour which leads to a condenser space.

Approximately at the place where the narrowed slot of the buffer space merges into the curved, diverging supply slot of the snail-shell-shaped space, the liquid starts to evaporate under the influence of the lower pressure in the snail-shell.

The invention with its different aspects will be explained hereinafter with reference to the drawing, which schematically shows some embodiments. In the drawing:

FIG. 1 shows a vertical section over a part of a slot-shaped passage channel with alternately snail-shell-shaped and syphon-shaped spaces, through which channels the liquid to be processed flows from above to below;

FIG. 2 shows a vertical section over some subsequent spaces;

FIG. 3 shows a vertical section over a slightly modified, respectively more simple configuration of the spaces;

Figure 5:
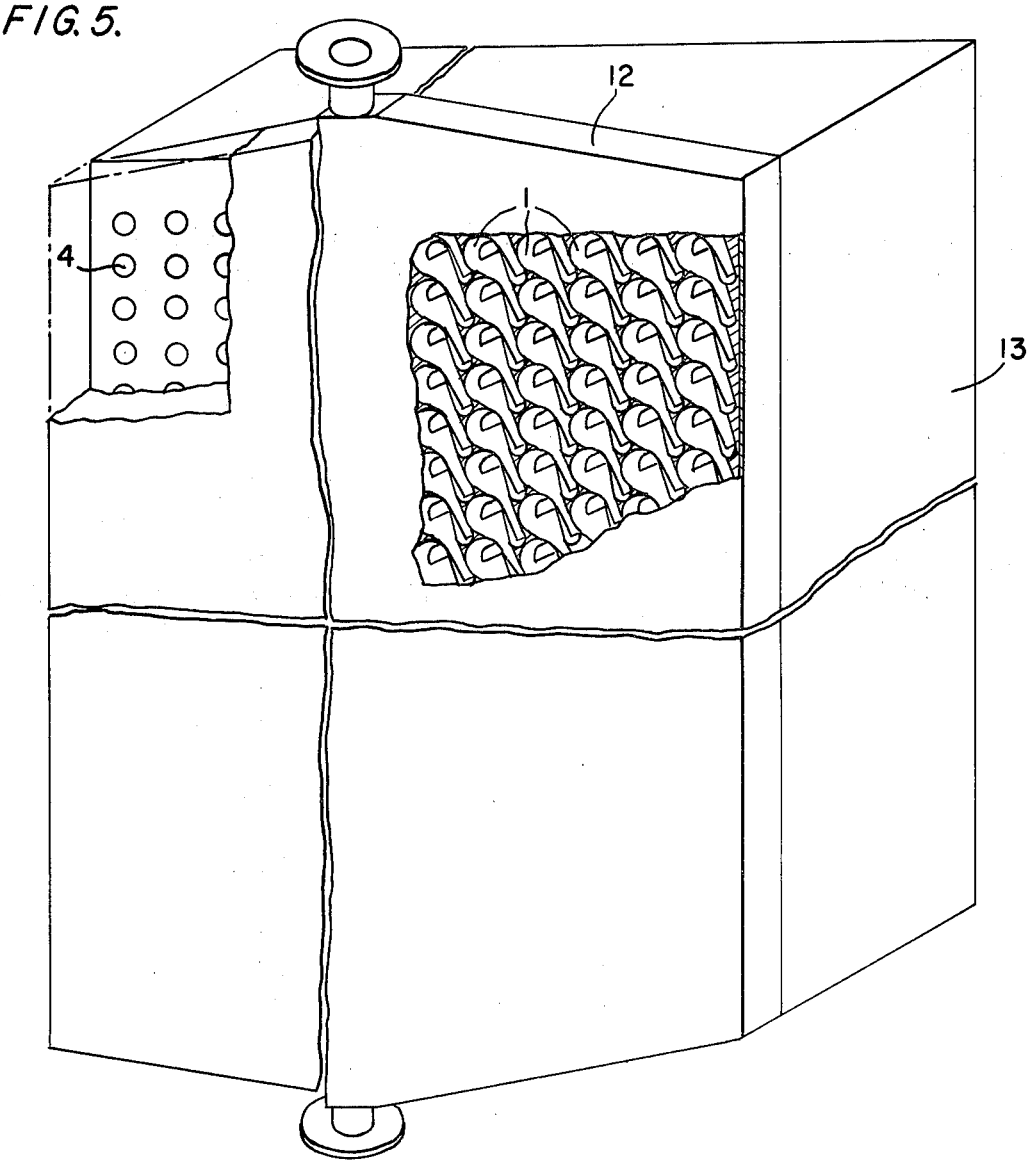

FIG. 5 gives a view, partially in section, of an installation built with use of the invention.

Figure 6:
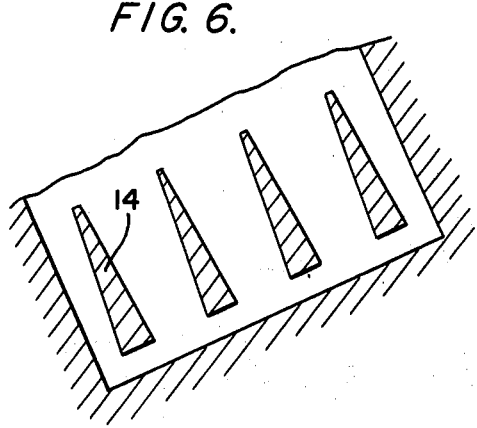
Figure 7:
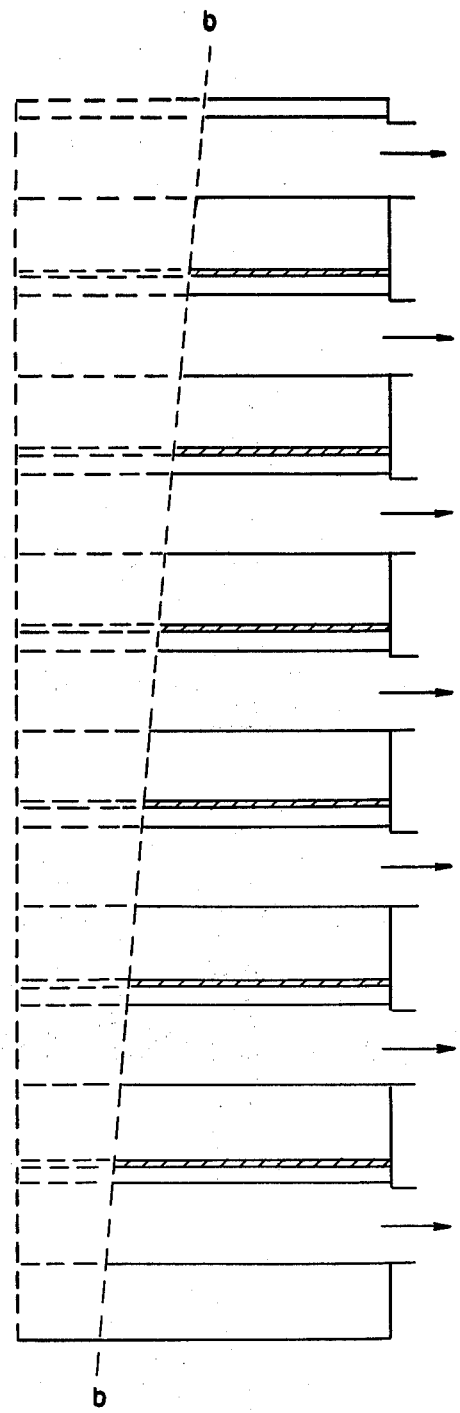

FIG. 6 shows a section view of an embodiment along line VI—VI of FIG. 1 of the influencing of the flow resistance for the liquid to be processed, in which in the rising channel 6 of the syphon-shaped space resistance-creating devices have been built;

FIG. 7 shows a section along the line VII—VII of FIG. 1, showing schematically the influence of the flow resistance for the liquid to be processed by means of selecting the active width of the passage channel according to a certain course.

In FIG. 1, reference number 1 indicates a part of the passage channel which is connected at the top side to a supply for liquid to be processed and at the under side to an exhaust for unevaporated liquid. The channel is in general slot-shaped, which means that the dimension at a right angle to the plane of the drawing is larger, at least at most places, than the cross dimension as visible in the drawing.

The passage channel alternately constitutes snail-shell-shaped spaces 2,2¹ etc, and syphon-shaped spaces 3,3¹ etc., which merge into one another.

In each of the snail-shell-shaped spaces evaporation takes place of a part of the liquid supplied thereto as a result of the pressure prevailing in this space, which is lower than corresponds to the temperature of the supplied liquid.

The vapour formed is evacuated through an orifice 4,4¹ etc. in one of the or both end walls towards a condenser space, where the vapour condenses, thus maintaining the lower pressure.

At its under side, an evaporation space merges into the wide descending leg 5,5¹ etc. of the syphon space 3,3¹ etc. which gradually narrows in the flow direction. The rising leg 6,6¹ etc. narrows further until the place indicated by a,a¹ etc. At this place the slot starts to diverge and can be considered as the supply channel of the snail-shell. The wall 8,8¹ etc., which limits this channel 7,7¹ etc. towards the centre of the chamber, partially encloses the central chamber part with the vapour exhaust orifices 4,4¹ etc.

The installation works as follows (see FIG. 2).

Starting with an evaporation chamber or cell, this chamber or cell is supplied at a with a homogeneous liquid, of which the temperature and pressure are higher than the temperature and pressure in the space 2. Approximately at a the liquid starts to evaporate, which evaporation continues in the channel 7. The two-phase flow which occurs, is forced at high speed into the curved course formed by this channel, whereas by the centrifugal force the liquid is urged towards the outer wall of the snail-shell. As the slot through which the liquid enters the snail-shell has, in the direction at a right angle to the plane of the drawing, the same dimension as the channel 7 and the space 2, that is to say as the snail-shell, and as the latter lies horizontally with its axis, the liquid, which still emits vapour, will be spread equally and in a relatively thin film over the outer wall of the snail-shell, which favours the release and separation of vapour from the liquid. The liquid which has not yet been converted into vapour, flows along the outer wall of the snail-shell towards the wide entry leg 5 of the syphon, comes more or less to rest there, and gets the opportunity of further separation of vapour bubbles which might still be present. In the lowest point, where the pressure has risen hydrostatically, therefore only a homogeneous liquid mass flows.

This homogenous flow maintains itself in the rising leg 6 of the syphon, so that pure liquid can start to evaporate at a.

The vapour released in a snail-shell gathers itself at the inside of the channel 7 and finally leaves, in the shape of a vortex, the central part of the snail-shell through an orifice 4.

Practice has shown that with an evaporator as described a surprisingly high stability is obtained by the combined action of the syphon and the diverging evaporation channel connected thereto, which means that at an approximately constant development of the pressure differences over the subsequent chambers, the evaporator can process different, strongly varying quantities of liquid, without a modification of the passage channels being necessary. This is in contrast with the known installations, in which to change e.g. from full load to a lower load, the connections between the evaporation chambers must be narrowed, e.g. by means of regulating devices in each of these connections.

A complete explanation of this unexpected phenomenon is difficult to give, but could be looked for in the phenomenon that the drop in pressure between two subsequent snail-shell-shaped spaces (pressure stages) is a combination of the flow resistance in the one-phase flow regime and the propulsive pressure required by the acceleration forces in the two-phase flow regime, as these occur in the very specially shaped passage channels. A small displacement of the transition point from one-phase to two-phase flow, as well as a variation of the distance which the two-phase flow needs to reach its maximum speed have an important influence on the drop in pressure.

The operation of a multi-stage-flash evaporator according to the invention has shown, that the production of the evaporator can be varied in a simple way by varying the supplied quantity of liquid e.g. from 100% to 50%, whereas the temperature- and pressure-rates over the evaporator do not or hardly change.

This particular feature of the evaporator, combined with the very short stay of the liquid in the evaporator, make it possible to obtain stable operating conditions within a few minutes after starting or modifying the production.

In the embodiment according to FIG. 3, the bag-shaped buffer space is carried out more simple. It has appeared that with such an embodiment, a good automatic adaptation to the quantity of liquid or stability is obtained for a limited flash range only (this is the temperature difference c.q. pressure difference over the passage channel), and more specifically in the low temperature range.

It will be obvious that at increasing pressure differences over the subsequent evaporation chambers, the syphon will have to be deeper to supply the liquid to be evaporated as a one-stage flow to the next snail-shell-shaped space. In connection with the desirability of uniform evaporation chambers and compactness of the installation, there will be a practical limit to the dimensions of the syphon, as is indicated e.g. in FIG. 2. This embodiment will give a good adaption and stability for a rather large temperature range.

If used in evaporators with an extremely high starting temperature, e.g. 120° C., it will no longer be practical to make the syphon deeper. So as still to be able to use the described uniform evaporation chambers, without making too great concessions to compactness and efficiency, an extra flow resistance can be built in, which proved to provide good results. This can be done in the rising channel 6 of the syphon or in the flash channel 7. However, a resistance-creating device is built preferably in the rising channel 6. Several ways are possible to obtain sufficient flow resistance in order to avoid excessive vapour in the syphon-shaped space. According to the invention it is possible to obtain an influencing of the flow speed and thereby of the resistance e.g. by choosing or setting the active width of the passage channel according to a certain chosen course.

In FIG. 7, such a chosen course is indicated schematically by a dotted line bb. The passage channel for the liquid to be processed is formed by the part at the right side of this dotted line. In order to achieve this, a partition can be placed in the installation along this dotted line, which prevents the liquid to be processed from coming left of this dotted line, or the passage channel can be made of a number of chambers or cells, which have increasing dimensions from above to below, in other words of a number of non-identical chambers or cells.

It is obvious that the two last-mentioned constructions cannot be realized in a simple and inexpensive way. These drawbacks are avoided in a simple way by the embodiment shown schematically in FIG. 6. In this embodiment, inserts 14 have been placed in the transition from some chambers or cells to a next chamber or cell, of which inserts the resistance-creating effect decreases from the supply side for the liquid to be processed of the installation to the exhaust side of the unevaporated liquid.

Figure 4:
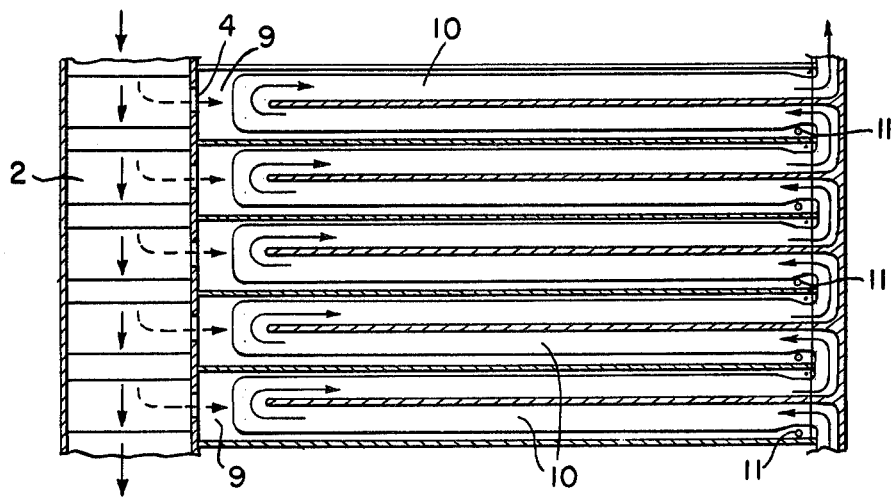
FIG. 4 shows a vertical section, at a right angle to that of FIG. 1, and taken over the spaces in which evaporation and in which condensation takes place.

FIG. 4 gives a vertical section, at a right angle to that of FIG. 1, over the evaporation part and the condensation part of an installation according to the invention.

Each evaporation space or cell 2 is connected through a vapour exhaust orifice with a separate condensation space 9; in these condensation spaces hollow cooling means 10 are provided, e.g. in plate- or pipe-shape, through which flows the liquid to be processed, which serves as cooling liquid in a flow direction opposite to the flow in the evaporation part.

The formed condensate, thus de-salted water in case the installation processes sea water, is evacuated from the condensation spaces through orifices 11.

It has appeared that with an installation according to the invention, the difference between the temperature of the liquid evaporating in an evaporation space and the surface temperature of the corresponding condenser is essentially smaller than in conventional installations as a result of the controlled evaporation, mainly from a thin film, and as a result of the absence of special spearators of liquid particles carried along with the vapour. This small temperature difference means a low energy consumption.

It can be concluded from FIGS. 1 and 4, that a very compact, little space-demanding construction of an installation according to the invention is possible. This is illustrated further by FIG. 5, which more or less schematically gives a view, partially in section, of such a construction. The evaporator part 12 has a large number of parallel-connected passage channels 1, of which the evaporation spaces are connected through the orifices with the condenser part 13. As this Figure shows, only little dead space remains in the evaporator part between the passage channels, It is very suitable to form these channels in a box-shaped block, made of an easily workable material such as synthetic material or aluminium. Of a number of parallel-connected boxes, one or more can be switched off for further regulating the capacity.

As explained above, the combination of syphon and snail-shell-shaped space allows a self-regulating (self-controlling) operation in a wide temperature range for the installation according to the invention, which range, while maintaining the compactness of the installation, can be increased by incorporating resistance-creating devices in e.g. the rising channel of the syphon, of which a possible embodiment is given in FIG. 6.

The invention is not restricted to an installation as described. The evaporation cells e.g. can be arranged not only in a vertical row, but also in an inclining or even horizontal row.

We claim:

1. Multi-stage flash evaporator, in particular suitable for the desalinization of sea water, comprising at least one, essentially slot-shaped, generally downwardly extending passage channel leading from the upper supply of liquid to be evaporated to the lower exhaust of unevaporated liquid, which passage channel constitutes a series of alternately snail-shell-shaped convolute spaces and bag-shaped buffer spaces acting as a liquid lock or syphon, in the former spaces having a vapor exhaust near their center, and with centrifugal force the separation of vapor from liquid taking place and in the latter spaces mainly transportation of unevaporated liquid from a snail-shell-shaped space to the next lower snail-shell-shaped space taking place.

2. Multi-stage-flash evaporator according to claim 1, in which of each snail-shell-shaped space with horizontally situated longitudinal axis, the curved over its full length and in cross section slot-shaped entry channel is carried out diverging.

3. Multi-stage-flash evaporator according to claim 1, in which each snail-shell-shaped space has a curved diverging entry channel and that wall thereof, which is nearest to the centre of the snail-shell-shaped space, partially encloses the central part of this space, in one of the or in both end walls of the said central part functioning as a vortex chamber an exhaust orifice for vapour being provided, which leads to a condenser space.

4. Multi-stage-flash evaporator according to claim 1, in which the bag-shaped buffer space is carried out as a syphon, and each syphon or V-tube is carried out slot-shaped in cross section and is carried out mainly converging in the flow direction.

5. Multi-stage-flash evaporator comprising a series of alternately snail-shell-shaped evaporation spaces and syphon-shaped or V-shaped spaces for transportation of unevaporated liquid from a snail-shell-shaped space to the next lower snail-shell-shaped space, in which the descending leg of each syphon which converges in the direction of flow, is of such dimensions that vapour bubbles which might be present in the liquid, can be separated within this leg.

6. Multi-stage-flash evaporator according to claim 5, in which the rising, converging leg of a syphon is connected at its narrowest place to the narrowest place of a diverging entry channel of a snail-shell-shaped evaporation chamber, possibly through a part with constant passage area.

7. Multi-stage-flash evaporator according to claim 1, in which the essentially vertical passage channel, or a number of these parallel-connected channels with the snail-shell-shaped and syphon-shaped spaces, is provided within one single block-shaped body or within a number of block-shaped bodies connected to one another.

8. Multi-stage-flash evaporator according to claim 1, in which the essentially vertical passage channel, or a number of these parallel-connected channels with the snail-shell-shaped and syphon-shaped spaces, is provided within one single block-shaped body or within a number of block-shaped bodies connected to one another, and the mutual position of the parts of a passage channel or of more passage channels is chosen such, that of the volume of a block-shaped body or of more block-shaped bodies by far the greater part is taken by the passage channel or the passage channels.

9. Multi-stage-flash evaporator according to claim 1, in which the size of the passage area of the or each passage channel from the supply for the liquid to be processed to the exhaust of the liquid remaining after the processing of the liquid to be processed, increases.

10. Multi-stage-flash evaporator according to claim 1, in which in each passage channel inserts are provided in such a way, that the size of the passage area of the passage channel increases towards the exhaust of the remaining liquid.

11. Multi-stage-flash evaporator according to claim 1, in which the dimensions of the subsequent evaporation chambers or cells of the or each passage channel increase from the supply for the liquid to be processed to the exhaust of the remaining liquid.

* * * * *